(12) United States Patent
Mitra et al.

(10) Patent No.: US 6,910,173 B2
(45) Date of Patent: Jun. 21, 2005

(54) WORD VOTER FOR REDUNDANT SYSTEMS

(75) Inventors: Subhasish Mitra, Palo Alto, CA (US); Edward J. McCluskey, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 476 days.

(21) Appl. No.: 09/925,278

(22) Filed: Aug. 8, 2001

(65) Prior Publication Data

US 2002/0116683 A1 Aug. 22, 2002

Related U.S. Application Data

(60) Provisional application No. 60/223,686, filed on Aug. 8, 2000.

(51) Int. Cl.[7] .................... G06F 11/18; H03K 19/23; H03M 13/43
(52) U.S. Cl. .................. 714/760; 714/11; 714/820; 326/11
(58) Field of Search .................... 714/11, 760, 820; 326/11

(56) References Cited

U.S. PATENT DOCUMENTS

| | | | | |
|---|---|---|---|---|
| 3,665,173 A | * | 5/1972 | Bouricius et al. ............ 714/11 |
| 3,681,578 A | | 8/1972 | Stevens ....................... 235/53 |
| 4,017,742 A | | 4/1977 | James .......................... 307/357 |
| 4,091,293 A | | 5/1978 | Ando ........................... 307/205 |
| 4,375,683 A | | 3/1983 | Wensley ....................... 371/36 |
| 4,873,685 A | | 10/1989 | Millis, Jr. ..................... 371/36 |
| 5,084,878 A | | 1/1992 | Kanekawa et al. ........... 371/36 |
| 5,502,728 A | | 3/1996 | Smith, III ............... 395/182.03 |
| 5,719,871 A | | 2/1998 | Helm et al. ................. 370/479 |
| 5,995,559 A | | 11/1999 | Hedberg ...................... 375/479 |
| 6,044,486 A | | 3/2000 | Underseth et al. .......... 714/797 |
| 6,044,487 A | | 3/2000 | Li ............................... 714/797 |

OTHER PUBLICATIONS

Subhasish Mitra, Edward J. McCluskey: Word Voter: A New Voter Design for Triple Modular Redundant Systems, 18th IEEE VLSI Test Symposium (VTS'00), Apr. 30–May 4, 2000, pp. 465–470, Montreal, Canada.*
Subhasish Mitra, Edward J. McCluskey: Design of Redundant Systems Protected Against Common–Mode Failures; pp. 1–24; Mar. 2000; Center for Reliable Computing, Stanford, California 94305 URL: http://crc.stanford.edu/crc__papers/CRC–TR–00–2.pdf.*
Parhami, B.; Voting networks; Reliability, IEEE Transactions on , vol.: 40 , Issue: 3 , Aug. 1991, pp. 380–394.*

* cited by examiner

*Primary Examiner*—R. Stephen Dildine
(74) *Attorney, Agent, or Firm*—LUMEN Intellectual Property Services, Inc.

(57) ABSTRACT

The present invention provides a word voter for redundant systems with n modules wherein each of these n modules generates a word output. The word voter receives word outputs from each of the n modules. A voter decision is generated by the word voter utilizing a word basis of the word output of each of the n modules. The voter is based on a majority voting principle. The advantage of the present invention is that the word voter can be used to design redundant systems, such as, but not limited to, TMR systems, that are protected against common mode and multiple output failures. In addition, another advantage of the present invention is that is provides for a technique to efficiently design a TMR simplex system. The present invention provides a word voter for hardware systems.

56 Claims, 8 Drawing Sheets

WORD VOTER FOR REDUNDANT SYSTEMS

CROSS-REFERENCE TO RELATED APPLICATIONS

This application is cross-referenced to and claims priority from U.S. Provisional application 60/223,686 filed Aug. 8, 2000, which is hereby incorporated by reference.

STATEMENT REGARDING FEDERALLY SPONSORED RESEARCH OR DEVELOPMENT

This invention was supported in part by contract number DABT63-97-C-0024 from the Defense Advanced Research Projects Agency (DARPA). The U.S. Government has certain rights in the invention.

FIELD OF THE INVENTION

This invention relates generally to redundancy techniques in dependable systems. More particularly, it relates to a voter design for use in a redundant system.

BACKGROUND

Figure 1:
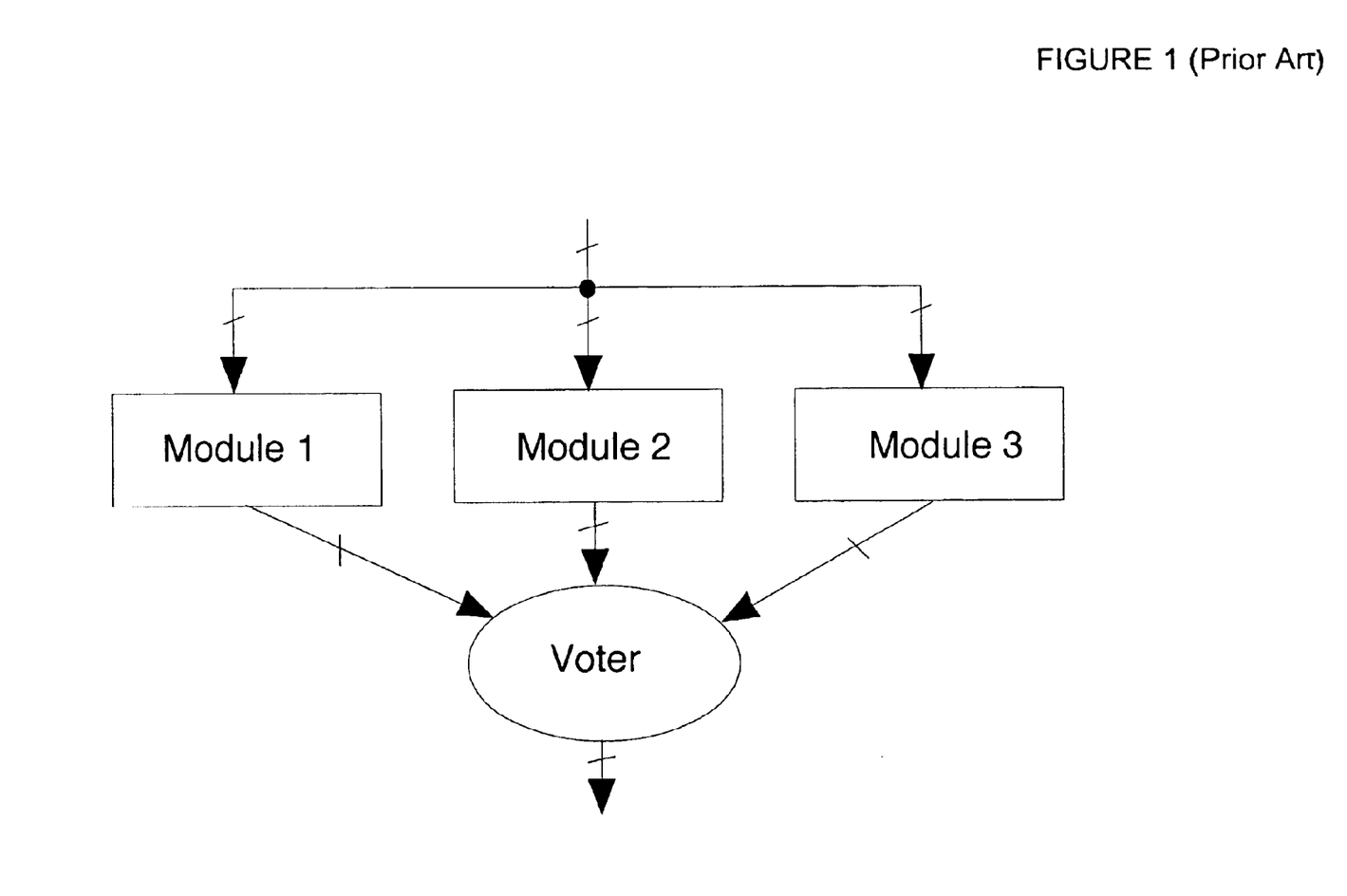
FIG. 1 An example of a triple modular redundancy system.

Redundancy techniques such as duplication and Triple Modular Redundancy (TMR) are commonly used for designing dependable systems to ensure high reliability, availability and data integrity. TMR is an example of a redundancy scheme that is used for fault-masking. A good reference for TMR is Von Neumann, J., "Probabilistic Logics and the Synthesis of Reliable Organisms from Unreliable Components," *Automata Studies, Ann. of Math. Studies*, no. 34, C. E. Shannon and J. McCarthy, Eds., Princeton University Press, pp. 43–98, 1956. In a TMR system, one uses three (same or different) implementations of the same logic function and the outputs of all the implementations are connected to a voter as shown in FIG. 1. There are numerous examples of dependable systems using the TMR technique as, for example, described by Siewiorek, D. P. and R. S. Swarz, *Reliable Computer Systems: Design and Evaluation*, Digital Press, 1992.

Figure 2:
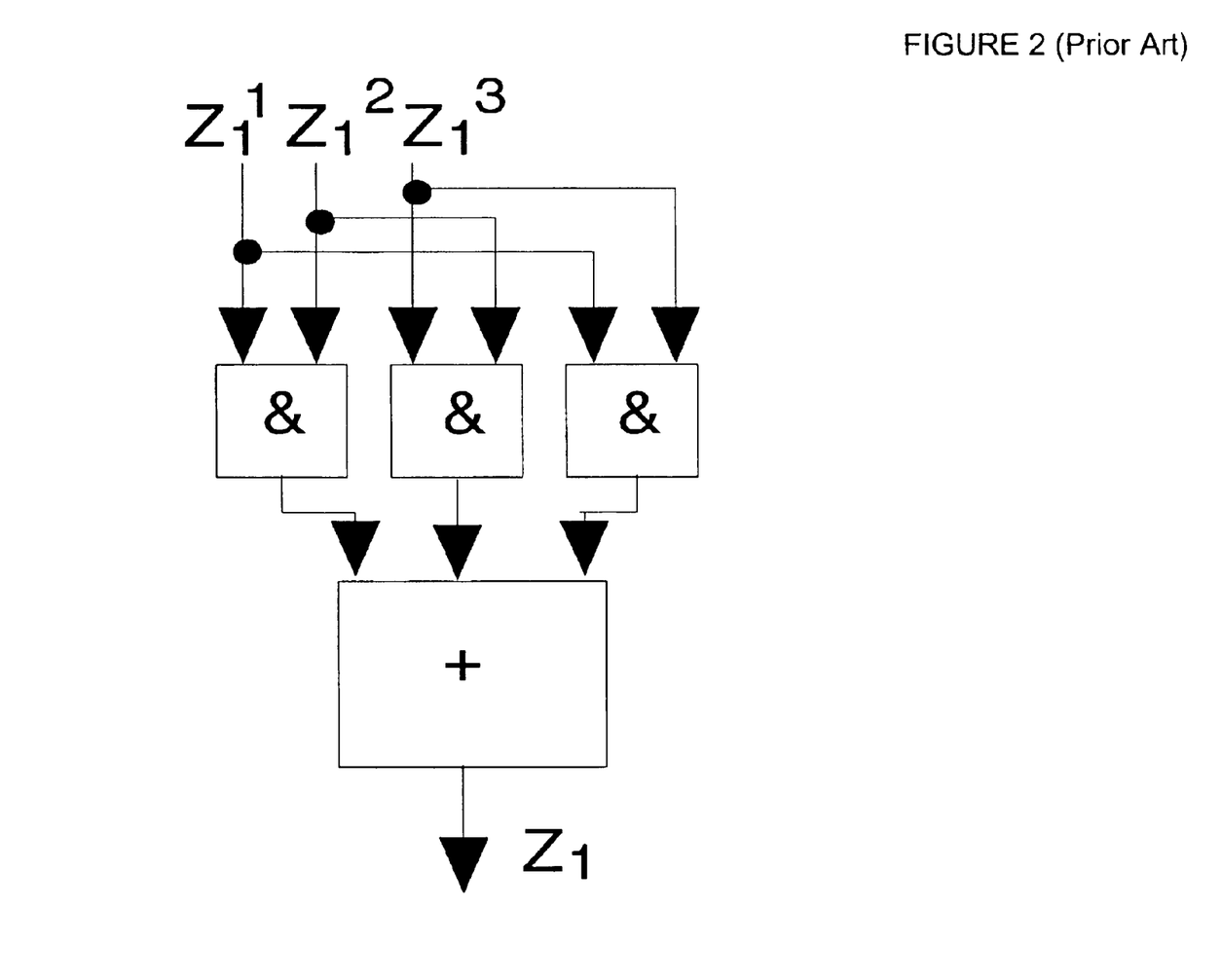
FIG. 2 An example of a majority voting circuit.

For voting on the outputs of the individual modules, majority voting circuits are generally used in TMR systems. FIG. 2 shows a design of a majority voting circuit. In FIG. 2, $Z_1^1$, $Z_1^2$ and $Z_1^3$ are the outputs corresponding to the bit position $Z_1$ of the three modules of the TMR system as shown in FIG. 1. The corresponding voted output bit of the system is $Z_1$.

Figure 3:
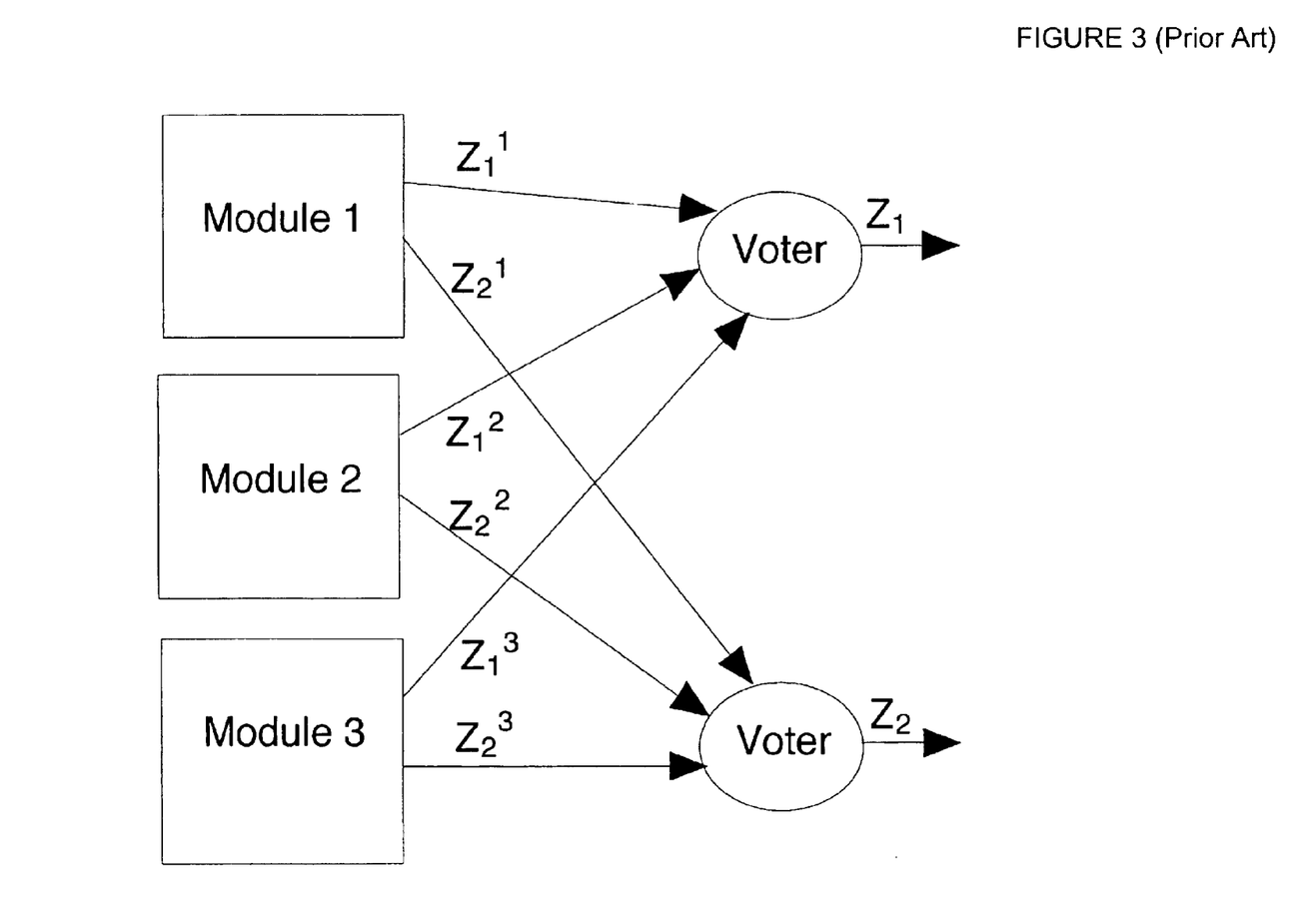
FIG. 3 An example of a TMR system with bit-wise voting.

In TMR systems, majority voting is normally performed on a bit-by-bit basis. For a system with n outputs, conventional TMR systems use n single-bit voters. FIG. 3 shows the implementation of such a TMR system with two outputs $Z_1$ and $Z_2$.

The prior art teaches reliability modeling of TMR systems as, for example, in Trivedi, K. S., *Probability and Statistics with Reliability, Queuing, and Computer Science Applications*, Prentice Hall, Englewood Cliffs, N.J., USA, 1982. For the classical TMR system shown in FIG. 1, the reliability R is given by the following expression:

$$R = R_m^3 + 3R_m^2(1-R_m)$$

In the above expression, $R_m$ is the reliability of each individual module in the TMR system. The above expression follows from the fact that for the TMR system to produce correct outputs, at least two of the three modules must produce correct outputs.

The classical reliability expression for TMR systems is optimistic because it does not consider common-mode failures. Lala observed that one must pay attention to the problem of common-mode failures (CMFs) as published in Lala, J. H. and R. E. Harper, "Architectural Principles for Safety-critical Real-time Applications," *Proc. of the IEEE*, Vol. 82, No. 1, pp. 25–40, January 1994. CMFs result from failures that affect more than one module of the redundant system at the same time, generally due to a common cause. They can be design faults or operational faults due to external (such as EMI and radiation) or internal causes. For example, a radiation source causing multiple-event upsets may lead to the failure of more than one module in a TMR system as taught, for example, by Reed in Reed, R., et al., "Heavy Ion and Proton-Induced Single Event Multiple Upset," *IEEE Trans. on Nuclear Science*, Vol. 44, No. 6, pp. 2224–2229, July 1997. There is no built in facility in conventional TMR voters to detect this situation and initiate appropriate actions.

Accordingly, there is a need for new voter designs for TMR systems that are useful in the context of common-mode and multiple failures that affect multiple modules in a TMR system. More generally, there is a need for new voter designs for modular redundant systems.

SUMMARY OF THE INVENTION

The present invention provides a voter for a redundant system with n modules wherein each of these n modules generates a word output. The word voter of the present invention receives word outputs from each of the n modules. Each word contains two or more bits. A voter decision is generated by the word voter utilizing a word basis of the word output of each of the n modules. The voter is based on a majority voting principle. The word voter contains $$\binom{n}{\lceil n/2 \rceil}$$

matching circuits. The matching can be based on exact matching or inexact matching depending on the type of signal. Inexact matching could for instance be threshold matching. The word voter of the present invention also generates an error signal when not a majority of modules in the n modules produces the same word output. This error signal could actually be a self-checking error signal. The word voter of the present invention could consider an entire word of each word output or just a subset of each word of each word output.

The redundant system is usually a circuitry system such as a logical circuitry module. However, the present invention is not limited to also having a data or signal processing module. In several embodiments, the present invention is shown using a triple modular redundancy system wherein n equals 3 modules. In another embodiment, the present invention is shown using a triple modular redundancy simplex system wherein n equals 3 modules and configures itself to a simplex system that includes a non-faulty module wherein n equals 1 module in case one of n modules becomes faulty. The redundant modular systems could include modules with different implementations though with the same functionality, or modules with the same implementations and the same functionality.

The present invention also provides a method of designing circuitry systems. The method steps include the step of providing a redundant system with n modules wherein each of these n modules generates a word output. Then a word voter is provided to receive these word output from each of the n modules, where after a voter decision is generated by the word voter utilizing a word basis of the word outputs of each of the n modules. In addition, the present invention provides a method wherein the word voter is used in hardware systems.

Furthermore, the present invention shows embodiments of hardware implementations of the word voter. First, a word voter with n outputs for a triple modular redundancy system is provided that includes three pair-wise matching circuits each having n XNOR gates and n 2-input AND gates to receive output vectors of modules of the triple modular redundancy system. In addition, this word voter includes 2n 2-input AND gates and n 2-input OR gates to generate the n outputs. This word voter could also include a one 3-input NOR gate to generate an error signal independent of the number of n outputs.

Second, a word voter with n outputs for a triple modular redundancy simplex system is provided that includes three pair-wise matching circuits each having n XNOR gates and n 2-input AND gates to receive output vectors of modules of the triple modular redundancy simplex system. In addition, this word voter includes 2n 2-input AND gates and n 2-input OR gates to generate the n outputs. This particular word voter for simplex systems also includes five 2-input AND gates and three 2-input OR gates independent of the number of n as well as three flip-flops also independent of the number of n. Again, this word voter also includes one 3-input NOR gate to generate an error signal independent of the number of n. Third, and more general, a word-voter with n outputs for a N modular redundancy system is provided that includes a $$\binom{N}{\lceil N/2 \rceil}$$

matching circuits which can be designed in different ways. The present invention provides two ways for designing these matching circuits. First, these matching circuits have n sub-circuits each containing two $|N/2|$-input AND gates and one 2-input OR gate. Second, these matching circuits have a minimum number of pair-wise matching circuits, wherein the minimum number is derived for each the N using a commonly known covering procedure. In addition, these pair-wise matching circuits each also have n XNOR gates and n 2-input AND gates to receive output vectors of modules of the N modular redundancy system and AND gates to combine the output vectors of these pair-wise matching circuits. The general word voter also includes one $$\binom{N}{\lceil N/2 \rceil} -$$

input NOR gate to generate an error signal independent of the number of n.

In view of that which is stated above, it is the objective of the present invention to provide a word voter design for redundant systems, in which voting decisions are made on a word basis rather than a bit basis.

It is another objective of the present invention to improve data integrity by at least an order of magnitude over conventional systems with bit-by-bit voting.

It is yet another objective of the present invention to provide a word voter in redundant systems to avoid incorrect results in the event of common-mode failures such as design faults or operational faults or multiple faults.

It is still another objective of the present invention to provide a word voter for TMR systems.

It is still another objective of the present invention to provide a word voter for TMR-Simplex systems. TMR-Simplex systems are widely used for their higher reliability compared to TMR systems.

It is still another objective of the present invention to provide a word voter for N-modular redundancy systems.

It is still another objective of the present invention to provide a word voter for redundant systems with multiple outputs.

It is still another objective of the present invention to provides a word voter for hardware systems.

The advantage of the present invention is that the word voter can be used to design redundant systems, such as, but not limited to, TMR systems or N-modular redundancy systems, that are protected against common mode and multiple output failures. In addition, another advantage of the present invention is that it provides for a technique to efficiently design a TMR simplex system.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 4:
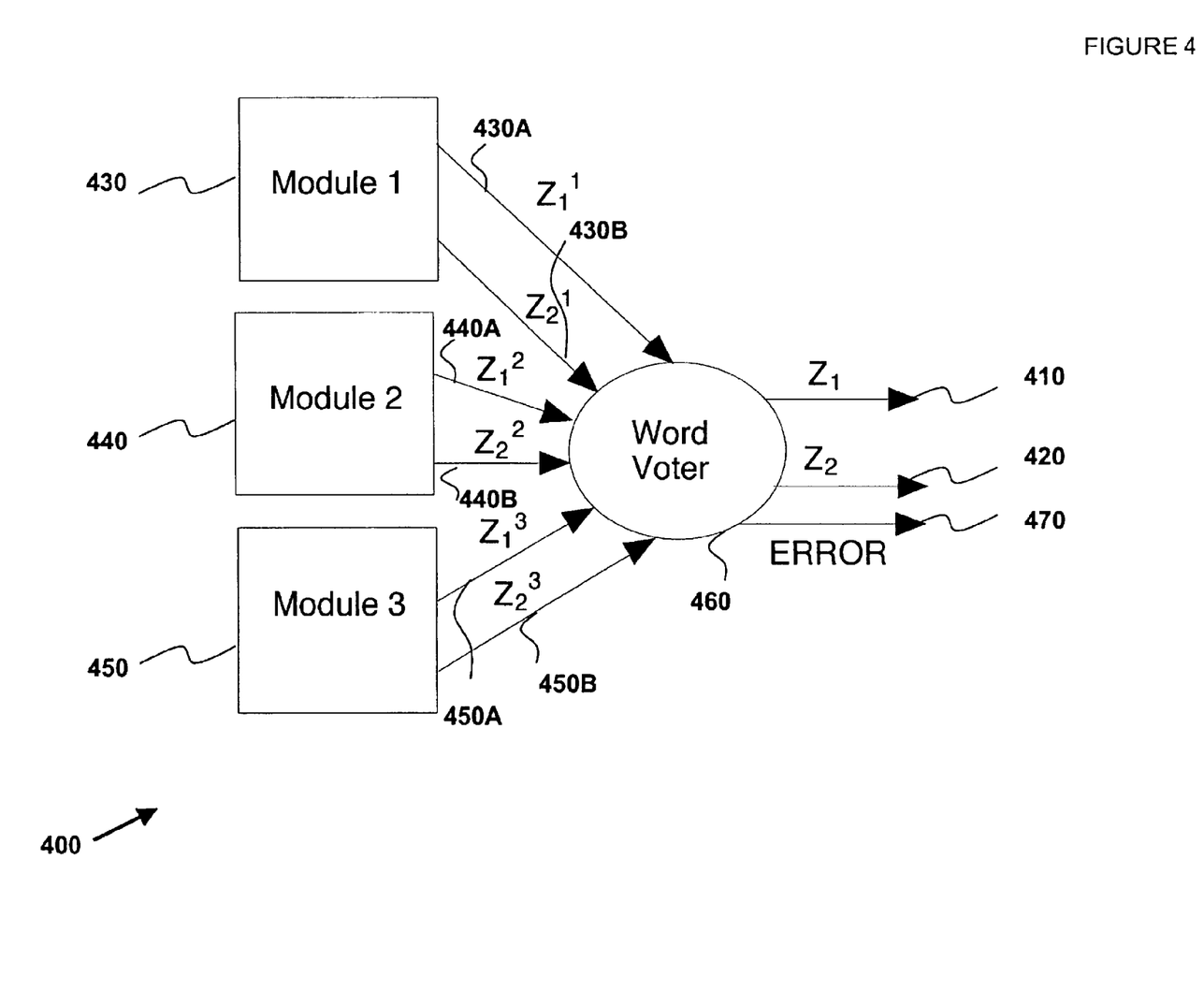
FIG. 4 A TMR system with word voter according to the present invention.

The present invention provides a new voter design for redundant systems called the word voter. That is, the entire output word from each module in a redundant system is considered when making the decision. However, the present invention is not limited to considering the entire word since also a subset of the word can be used when making a decision. In a preferred embodiment of the present invention, the word voter utilizes a majority voting principle. For example in case of TMR systems, if no two modules generate the same output, then the voter returns an error signal rather than an output value. In general, the redundant systems include n modules and in that case majority voting is when a majority generates the same output. In a TMR systems, there are 3 modules. Each module can have different implementations though with the same functionality. However, each module can have the same implementations with the same functionality. As an exemplary embodiment of the present invention, FIG. 4 shows a TMR system 400 with two outputs 410 and 420, and a word voter 460. Examples of modules that could be used as building blocks or modules of a redundant system are, for instance, but not limited to data or signal processing modules and logical circuitry modules. The present invention also includes signal processes from, for instance, but not limited to, a human operator waiving his/her hand whereby the hand movement is detected by hardware and translated in, for instance, a Boolean signal. A TMR system requires three copies (either the same or different implementations) of a given module, i.e. 430, 440 and 450, to form TMR system 400. In FIG. 4, suppose that a failure source causes faults in the first 430 and the second 440 modules of TMR system 400. Due to the presence of the fault in Module 1 430, in response to a particular input combination, module 1 430 produces an output combination 10 instead of 01. $Z_1^1$ and $Z_2^1$ are the bit outputs 430A and 430B that define the word or output combination that correspond to module 1 430. Similarly, due to the presence of the fault in Module 2 440, the output combination obtained from Module 2 440 is 11. $Z_1^2$ and $Z_2^2$ are the bit outputs 440A and 440B that define the word or output combination that correspond to module 2 440. Finally, in this example, Module 3 450 is fault-free and produces an expected output 01. $Z_1^3$ and $Z_2^3$ are the bit outputs 450A and 450B that define the word or output combination that correspond to module 3 450. The outputs of each module in TMR system 400 is shown in Table 1.

As shown in Table 1, with bit-wise voting, the voter corresponding to the first output bit produces a 1 and the one corresponding to the second output bit produces a 1. Thus, 11 is the result at TMR system 400 output. However, if one considers the output word from each module 430, 440 and 450, the output words from all the three modules are found to be different. The output words from the first 430, second 440 and third 450 modules are 10, 11 and 01, respectively. This can be treated as an erroneous condition for a voter, which works on a majority voting principle, because, no two output words are equal. Based on this observation, one can modify the classical voter design by adding extra circuitry that detects this error condition and produces an error 470. The error signal can be a self-checking error signal. Thus, the TMR system with the word voter 460 is capable of maintaining data integrity for this example in FIG. 4. In response to the error signal 470, appropriate action (depending on the application) can be initiated.

TABLE 1

An example of voting in a TMR system

| Module | Fault-free Outputs | Faulty Outputs |
|---|---|---|
| 1 | 01 | 10 |
| 2 | 01 | 11 |
| 3 | 01 | 01 |
| Bit-wise Voting | 01 | 11 |
| Word-wise Voting | 01 | No majority |

Figure 5:
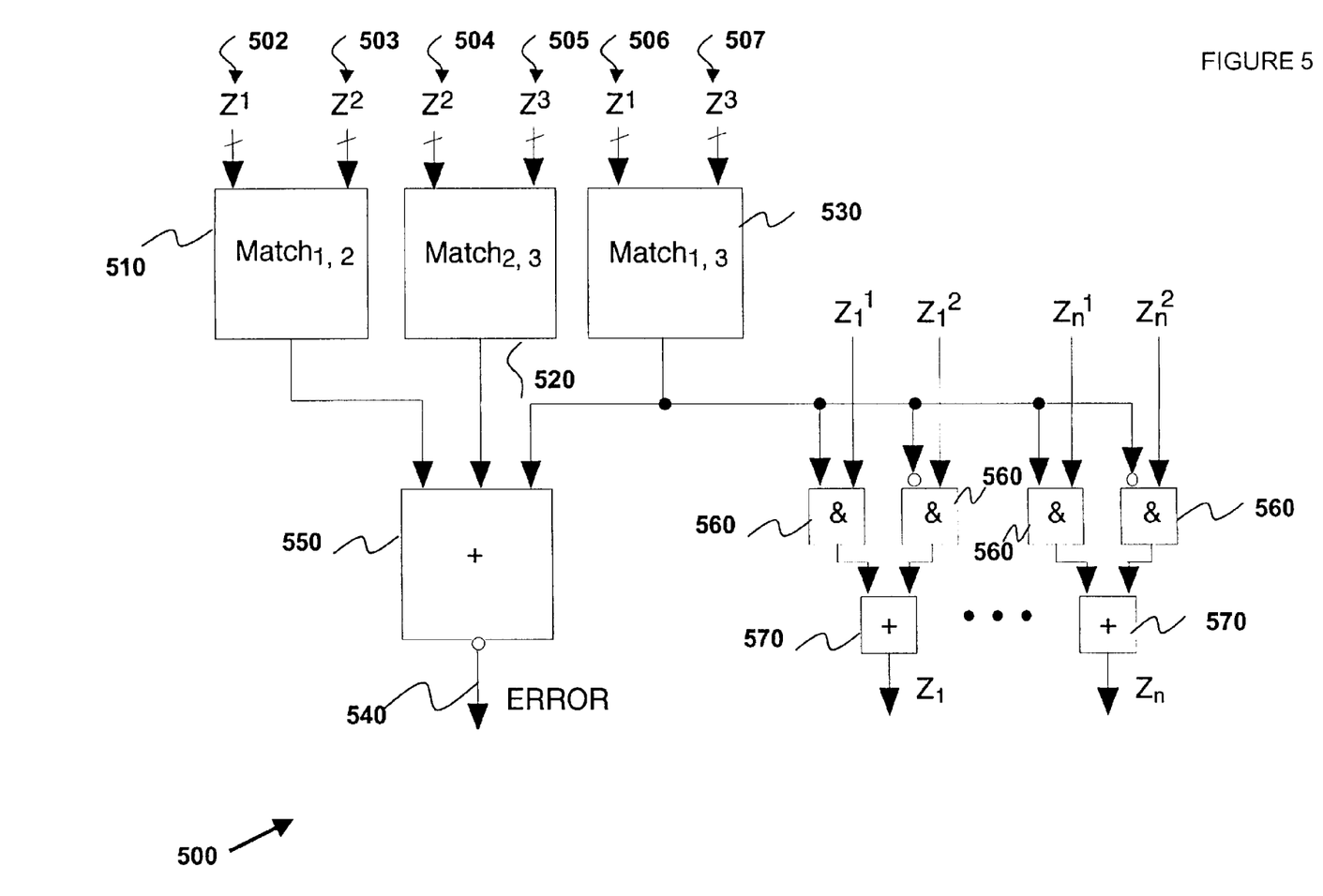
FIG. 5 A word voter for a system with n outputs $Z_1, \ldots, Z_n$ depicting a complete design according to the present invention.

FIG. 5 shows an exemplary embodiment of word voter 500 for a TMR system where each module has n outputs. Let $Z^i$ denote the output vector from the $i^{th}$ module. For example, $Z^1$ denotes the output vector from the $1^{st}$ module. Also, let $Z_j^i$ denote the $j^{th}$ bit of $Z^i$. For example, $Z_1^1$ denotes the $1^{st}$ bit of $Z^1$. Word voter 500 produces outputs $Z_1 \ldots Z_n$.

Figure 6:
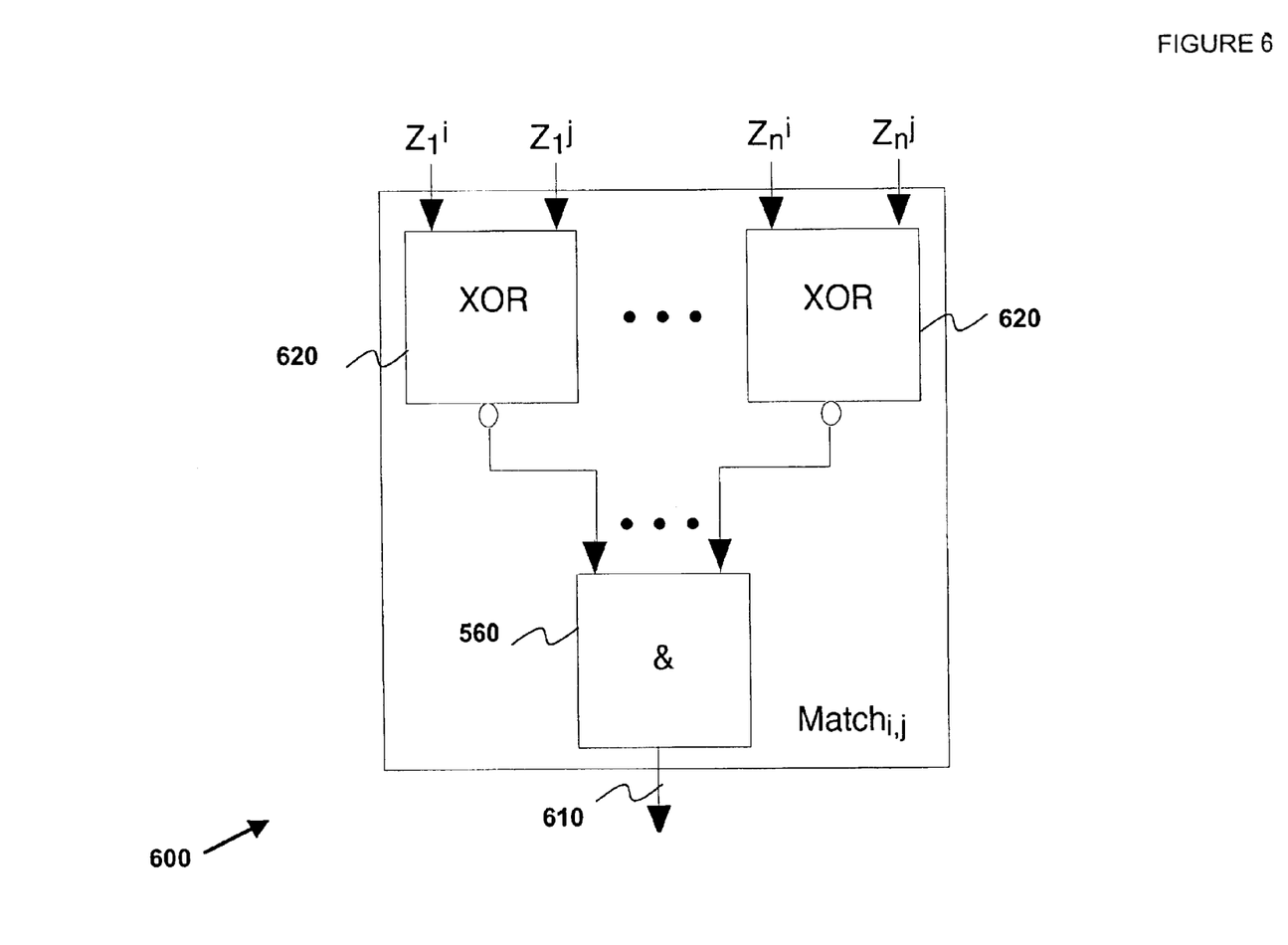
FIG. 6 A word voter for a system with n outputs $Z_1, \ldots, Z_n$ and a matching circuit $Match_{i,j}$ according to the present invention.

FIG. 6 shows an exemplary embodiment of a pair-wise matching circuit Match$_{i,j}$ 600, which produces output 610, for instance, a 1 if and only if modules i and j produce the same output word. Pair-wise matching circuit Match$_{i,j}$ 600 in FIG. 6 is an example of a pair-wise matching circuit of either Match$_{1,2}$ 510, Match$_{1,3}$ 520, or Match$_{2,3}$ 530 as shown in FIG. 5. As in FIG. 5, $Z_j^i$ denotes the $j^{th}$ bit of $Z^i$ which is the output vector from the $i^{th}$ module. For example, $Z_1^1$ denotes the $1^{st}$ bit of the output vector of the $1^{st}$ module.

Following the example in Table 1, for a particular input combination, the three modules produce the following outputs: $Z_1^1=1, Z_2^1=0, Z_1^2=1, Z_2^2=1$ and $Z_1^3=0, Z_2^3=1$. Referring to FIG. 5, Match$_{1,2}$ 510=Match$_{1,3}$ 520=Match$_{2,3}$ 530=0 and the ERROR signal 540 equals 1.

In the following example, a situation is considered where the output words from at least two modules match. In that case, the ERROR signal 540 will not be equal to 1. If the output words from modules 1 and 3 match, word voter 500 in the TMR system produces an output word that is the same as the one produced by module 1. If the output words from modules 1 and 3 do not match (i.e., Match$_{1,3}$=0), then the output word produced by word voter 500 is equal to the one produced by module 2.

Use of median voters has been proposed in the past for voting purposes in TMR systems as, for instance, in Dennis, N. G., "Ultra-reliable Voter Switches with a Bibliography of Mechanization," *Microelectronics and Reliability*, pp. 299–308, August 1974. In a TMR system, a median voter selects the median of the output words from the three modules to be the output of the TMR system. For that purpose, the voter performs a magnitude comparison of the output words from the three modules. Although it is not obvious to make a median voter as a word voter, a median voter can be modified to operate as a word voter. If someone were just to take a median voter design, they cannot implement a word voter. In the case of a median voter, an error signal is generated if the magnitudes of the outputs of the three modules are different. Since a median voter performs magnitude comparison, its area overhead is generally more than the design in FIGS. 5 and 6.

The word voter of the present invention detects erroneous conditions that can otherwise produce incorrect outputs with bit-by-bit voting. The present invention enhances data integrity of a TMR system. For quantifying the data integrity enhancement, a metric s can be used. Metric s is defined as the probability that a TMR system with the word voter will produce an error signal at least once before producing an incorrect output combination, in the presence of multiple module failures. S is estimated as the percentage of cases for which the word voter generated the error signal at least once before the system generated incorrect outputs. The estimated value of s increases with increasing number of outputs. This is intuitive since, the more outputs, the more is the possibility that the output words from the three circuits are different. Note that if there is a single module fault, there will be no ERROR signal. Data integrity of a TMR system with the word voter of the present invention is improved. Data integrity of a TMR system is defined as the probability that the system does not produce corrupt (incorrect) outputs before indicating an erroneous situation in any of the previous cycles.

As an example, a discrete time model of a TMR system is considered. In this discrete time model, time is divided into discrete increments called cycles and inputs are applied at the beginning of each cycle. Consider a TMR system with a word voter where the probability that a module produces correct outputs in any given cycle is $R_m$. In addition, suppose that s is the probability that the word voter in the TMR system produces an error signal at least once before producing corrupt (incorrect) outputs when two modules fail. In this case, the data integrity of the system up to time T is given by the following expression:

$$R_m^{3T}+3R_m^{2T}[1-(1-R_m)^T]+3sR_m^{T}[1-(1-R_m)^T]^2$$

The above expression follows from the fact that when at least two modules are working correctly, the system always produces correct outputs. However, when two modules are faulty, data integrity is maintained when the system produces the error signal at least once before producing corrupt outputs. Hence, the factor s appears in the third term of the above expression.

Figure 7:
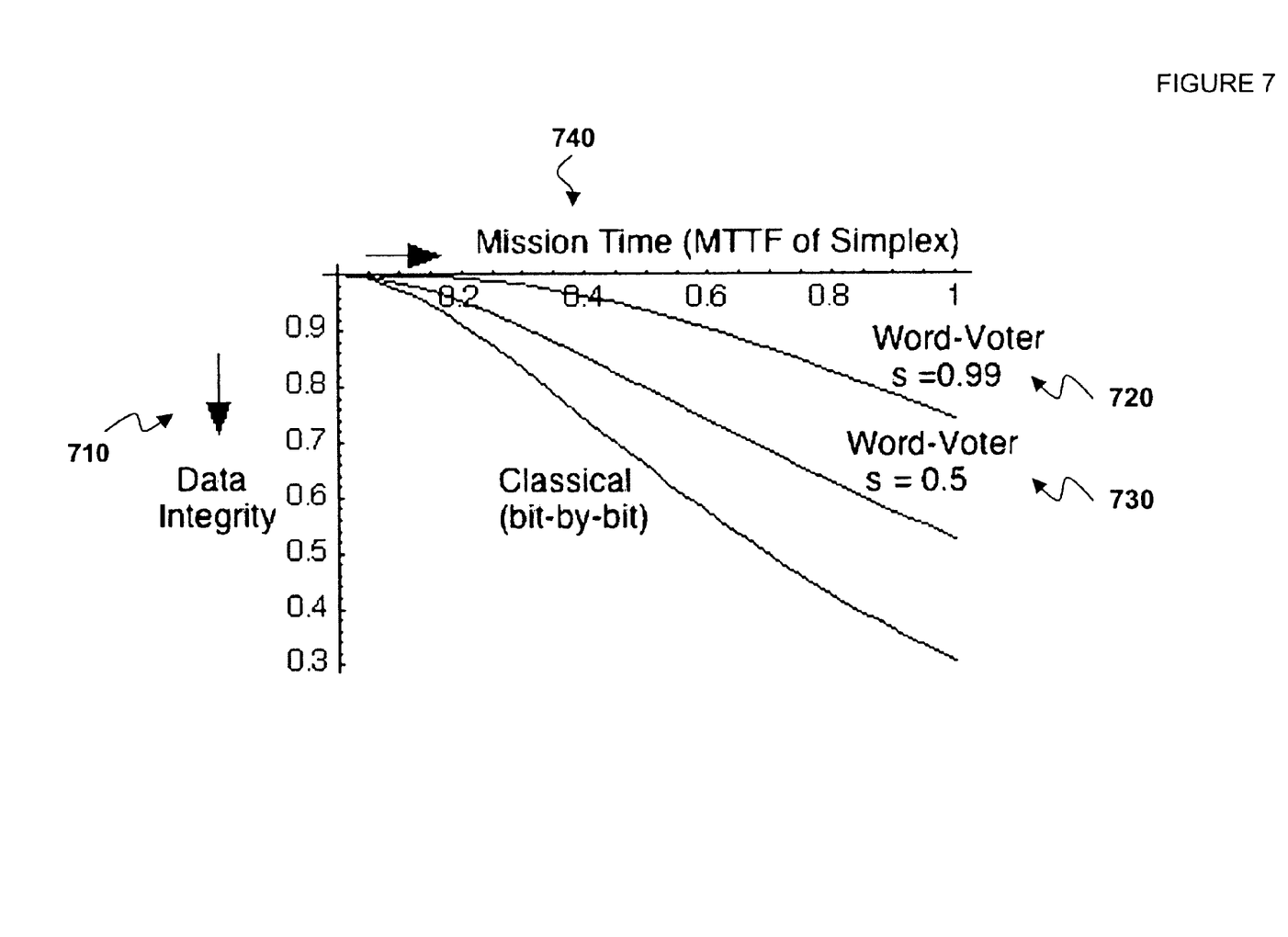
FIG. 7 An illustration of data integrity of a TMR system with word voting according to the present invention.

FIG. 7 shows the data integrity 710 of a TMR system with the word voter for different values of s, such as 720 and 730. The simplex reliability ($R_m$) is equal to $1-10^{-12}$. On the X-axis 740, the mission time of the system is measured and 1 unit of time corresponds to the MTTF (Mean Time to Failure) of a simplex system (consisting of only one module). It is clear from FIG. 7 that the data integrity improves at least by an order of magnitude for increasing values of s. A TMR system with the classical bit-by-bit voter has s equal to 0. FIG. 7 shows the effectiveness of using word voters for designing TMR systems with high data integrity.

As discussed above, the word voter of the present invention produces an error signal when the three modules of a TMR system produce different output combinations. However, that does not mean that the TMR system will always produce incorrect outputs in this situation. This is illustrated using the example in Table 2.

TABLE 2

Correct outputs from a TMR system in the presence of multiple module Failures

| Module | Fault-free Outputs | Faulty Outputs |
| --- | --- | --- |
| 1 | 000 | 100 |
| 2 | 000 | 010 |
| 3 | 000 | 000 |
| Bit-wise | 000 | 000 |
| Word-wise | 000 | No majority |

In the exemplary TMR system of Table 2, all the three modules are supposed to produce the output combination 000 in the fault-free case. However, due to the presence of faults in the first and the second modules, Module 1 and Module 2 produce output vectors 100 and 010, respectively. Although the output vectors from the three modules are different, a bit-by-bit voting scheme will produce the correct combination 000 at the system output. This situation is an example of a compensating fault. Note that, the word voter design of the present invention will indicate an error signal in this case. Thus, with the word voter design of the present invention, error signal may be indicated for some compensating faults in the system.

For use in dependable systems, it is important for the user to receive the error signal as an indication that something wrong is going on which is not guaranteed to be tolerated by the system.

Compared to a TMR system with a bit-by-bit voter, the extra hardware needed by a TMR system with the word voter is of the order of one 2-input logic gate and three XNOR gates for each output of the TMR system. This is because, for a TMR system with n outputs, the number of equivalent 2-input gates required by the word voter and the bit-wise voter are 6n+2 and 5n, respectively. In addition, the TMR system with the word voter needs 3n XNOR gates. The derivation is shown in the next paragraph.

In general, according to FIGS. 5 and 6, a word voter 500 with n outputs $Z_1 \ldots Z_n$ for a triple modular redundancy system, includes three pair-wise matching circuits (510, 520 and 530) each having n XNOR gates 620 and n 2-input AND gates 560 to receive output vectors (502, 503, 504, 505, 506 and 507) of the modules of the triple modular redundancy system. In addition, the word voter 500 with n outputs for a triple modular redundancy system, includes 2n 2-input AND gates 560 and n 2-input OR gates 570 to generate said n outputs $Z_1 \ldots Z_n$. The word voter further includes a 1 3-input NOR gate 550 to generate an error signal 540 independent of number of n outputs $Z_1 \ldots Z_n$. For the word voter design 500 of FIG. 5, the delay in generating the final voted output is of the order of $\log_2 n$ 2-input gate delays (due to the presence of n-input AND gates in the matching circuits).

The word voter design of the present invention can be modified to guarantee that the data outputs (but not the ERROR signal) will be produced without any extra gate delay compared to conventional TMR systems. In this case, one can use the conventional bit-by-bit voters to produce the voted outputs. For generating the ERROR signal, one can use the part of the logic circuit of FIG. 5 that generates the error signal 540. In this case, the extra area overhead of the word voter design over a bit-by-bit voter is 3 n-input AND gates, 3n XNOR gates and 1 3-input NOR gate for a TMR system with n outputs. This is equivalent to 3n 2-input gates and 3n XNOR gates. It may be noted that, for a hybrid redundant n-output system with TMR core the overhead of 3n XNOR gates in the word voter design disappears.

The MTTF (Mean Time To Failure) of a TMR system is lower than that of the corresponding simplex system (containing only one module). Moreover, for mission time greater than seven-tenths of the MTTF of a simplex system, the TMR reliability is lower than the reliability of the corresponding simplex system. These problems can be overcome by using a TMR-Simplex system. In a TMR-Simplex system, one will have full TMR as long as all the three modules are functioning correctly. As soon as one of the modules becomes faulty (disagrees with the outputs of the other two modules), the system switches to simplex mode and only one fault-free module is chosen to produce outputs for subsequent operations.

Figure 8:
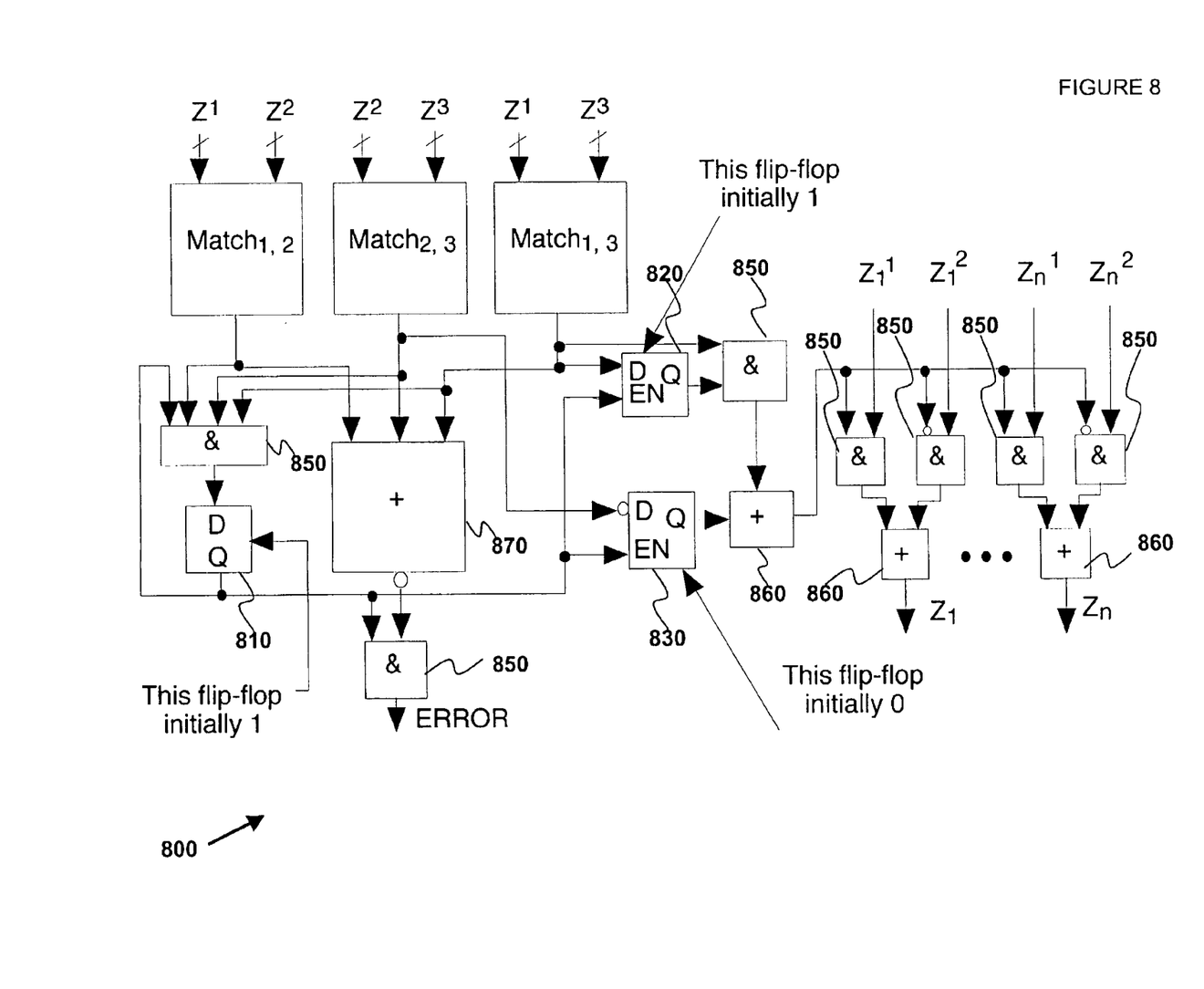
FIG. 8 A TMR-simplex system using a word voter according to the present invention.

The word voter design 800 can be used to efficiently design TMR-Simplex systems as shown in FIG. 8. There are three flip-flops 810, 820 and 830 in design 800 and they are all clocked by the same clock signal (not shown in FIG. 8). Two of the flip-flops 820 and 830 have clock-enable (aka gated clock, load-enable) inputs (EN) as shown in FIG. 8. The flip-flops 820 and 830 can be set or reset by an asynchronous retry signal (not shown in FIG. 8). Design 800 has less logic complexity compared to Sift-Out Modular Redundancy as described by De Sousa in De Sousa, P. T., and F. P. Mathur, "Sift-Out Modular Redundancy," *IEEE Trans. Computers*, Vol. C-27, No. 7, pp. 624–627, July 1978.

Referring to FIG. 8, initially, when all the modules produce correct outputs, the outputs of module 1 are produced at the voter outputs. If one of the modules (Module 1, for example) fails, pair-wise matching circuits $Match_{1,3}$ produces a 0 and $Match_{2,3}$ produces a 1. As a result, all flip-flops 810, 820 and 830 are reset to 0, and the outputs of Module 2 are produced at the voter output. Thus, the system behaves as a simplex system consisting of Module 2 only. The ERROR signal 840 will not be produced any more from this time onwards. If Module 2 fails, then pair-wise matching circuits Match$_{1,3}$ will produce a 1 and Match$_{2,3}$ will produce a 0 and the system will behave as a simplex system consisting of Module 1 only. If the output vectors ($Z^1$, $Z^2$ and $Z^3$) produced by the three modules are all different, the ERROR signal 840 will be equal to 1.

Note that, compared to the design in FIG. 5 one will need three extra AND gates (equivalent of five two-input AND gates), one extra two-input OR gate and three flip-flops, independent of the number of outputs. This shows the benefit obtained by using the word voter of the present invention in designing a TMR-simplex system.

In general, a word voter of the present invention with n outputs for a triple modular redundancy simplex system includes three pair-wise matching circuits 840, 850 and 860 each having n XNOR gates and n 2-input AND gates (similar as to FIG. 6) to receive output vectors of modules (such as $Z^1$ of the triple modular redundancy simplex system. A word voter simplex system further includes 2n 2-input AND gates 850 and n 2-input OR gates 860 to generate said n outputs $Z_1 \ldots Z_n$. Furthermore, the word voter for TMR simplex systems includes five two-input AND gates 850 and one two-input OR gate 860 independent of n. Lastly, the word voter for simplex systems includes three flip-flops 810, 820 and 830 independent of said n. In order to generate error signal 840, the word voter for simplex systems includes a 1 3-input NOR gate 870 and which is independent of said n.

In general terms, a word-voter of the present invention with n outputs for a N modular redundancy system can be described in two ways. First by having $$\binom{N}{\lceil N/2 \rceil}$$

matching circuits.

These matching circuits then include n sub-circuits each comprising two |N/2| input AND gates and one 2-input OR gate. Second by having a minimum number of pair-wise matching circuits, wherein the minimum number is derived for each said N using a commonly used covering procedure. The pair-wise matching circuits each have n XNOR gates and n 2-input AND gates to receive output vectors of modules of the N modular redundancy system. In addition, AND gates are included to combine the output vectors of the pair-wise matching circuits. As like TMR system discussed above, a word-voter of the present invention with n outputs for a N modular redundancy system could also include one $$\binom{N}{\lceil N/2 \rceil} -$$

input NOR gate to generate an error signal independent of n.

For systems with round-off errors, there is a possibility of non-exact matching of the outputs of the three modules. In that case, an interesting problem will be to determine thresholds. Then one can indicate error situations using the word voter design if the outputs of the three modules do not match within the threshold.

The present invention has now been described in accordance with several exemplary embodiments, which are intended to be illustrative in all aspects, rather than restrictive. For instance, using the word voter, one can design TMR systems for which one performs word-wise voting for only a subset of the output bits and bit-wise voting for the remaining output bits. In addition, the relationships among the subsets of the outputs and the system reliability and data integrity can be analyzed. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A voter for a redundant system with n modules wherein each of said n modules generates a word output, comprising:
    (a) a word voter receiving said word output from each of said n modules, wherein said word voter comprises inexact or threshold matching; and
    (b) a voter decision generated by said word voter utilizes a word basis of said word output of each of said n modules.

2. The voter as set forth in claim 1, wherein said word voter is based on a majority voting principle.

3. The voter as set forth in claim 1, wherein said word output comprises two or more bits.

4. The voter as set forth in claim 1, wherein said word voter comprises $$\binom{n}{\lceil n/2 \rceil}$$

matching circuits.

5. The voter as set forth in claim 1, wherein said word voter comprises exact matching.

6. The voter as set forth in claim 1, further comprising an error signal when not a majority of modules in said n modules generates a same word output.

7. The voter as set forth in claim 6, wherein said error signal is a self-checking error signal.

8. The voter as set forth in claim 1, wherein an entire word of said word output is considered by said word voter.

9. The voter as set forth in claim 1, wherein a subset of each word in said word output is considered by said word voter.

10. The voter as set forth in claim 1, wherein said redundant system is a circuitry system.

11. The voter as set forth in claim 10, wherein said circuitry system comprises a logical circuitry module.

12. The voter as set forth in claim 1, wherein said redundant system comprises a data or signal processing module.

13. The voter as set forth in claim 1, wherein said redundant system is a triple modular redundancy system and said n equals 3.

14. The voter as set forth in claim 1, wherein said redundant system is a triple modular redundancy simplex system and said n equals 3 and configures to a simplex system comprising a non-faulty module wherein said n equals 1 in case one of said n modules becomes faulty.

15. The voter as set forth in claim 1, wherein said n modules have different implementations with a same functionality.

16. The voter as set forth in claim 1, wherein said n modules have same implementations with a same functionality.

17. A method of designing circuitry systems, comprising the steps of:
    (a) providing a redundant system with n modules wherein each of said n modules generates a word output;
    (b) providing a word voter receiving said word output from each of said n modules, wherein said word voter comprises inexact or threshold matching; and (c) generating a voter decision by said word voter utilizes a word basis of said word output of each of said n modules.

18. The method as set forth in claim 17, wherein said word voter is based on a majority voting principle.

19. The method as set forth in claim 17, wherein said word output comprises two or more bits.

20. The method as set forth in claim 17, wherein said word voter comprises $$\binom{n}{\lceil n/2 \rceil}$$

matching circuits.

21. The method as set forth in claim 17, wherein said word voter comprises exact matching.

22. The method as set forth in claim 17, further comprising the step of generating an error signal when not a majority of modules in said n modules generates a same word output.

23. The method as set forth in claim 22, wherein said error signal is a self-checking error signal.

24. The method as set forth in claim 17, wherein an entire word of said word output is considered by said word voter.

25. The method as set forth in claim 17, wherein a subset of each word in said word output is considered by said word voter.

26. The method as set forth in claim 17, wherein said redundant system is a circuitry system.

27. The method as set forth in claim 26, wherein said circuitry system comprises a logical circuitry module.

28. The method as set forth in claim 17, wherein said redundant system comprises a data or signal processing module.

29. The method as set forth in claim 17, wherein said redundant system is a triple modular redundancy system and said n equals 3.

30. The method as set forth in claim 17, wherein said redundant system is a triple modular redundancy simplex system and said n equals 3 and configures to a simplex system comprising a non-faulty module wherein said n equals 1 in case one of said n modules becomes faulty.

31. The method as set forth in claim 17, wherein said n modules have different implementations with a same functionality.

32. The method as set forth in claim 17, wherein said n modules have same implementations with a same functionality.

33. A method of using a word voter for hardware systems, comprising the step of:

(a) providing a redundant system with n modules wherein each of said n modules generates a word output;

(b) providing a word voter receiving said word output from each of said n modules, wherein said word voter comprises inexact or threshold matching, and (c) generating a voter decision by said word voter utilizes a word basis of said word output of each of said n modules.

34. The method as set forth in claim 33, wherein said word voter is based on a majority voting principle.

35. The method as set forth in claim 33, wherein said word output comprises two or more bits.

36. The method as set forth in claim 33, wherein said word voter comprises $$\binom{n}{\lceil n/2 \rceil}$$

matching circuits.

37. The method as set forth in claim 33, wherein said word voter comprises exact matching.

38. The method as set forth in claim 33, further comprising the step of generating an error signal when not a majority of modules in said n modules generates a same word output.

39. The method as set forth in claim 38, wherein said error signal is a self-checking error signal.

40. The method as set forth in claim 33, wherein an entire word of said word output is considered by said word voter.

41. The method as set forth in claim 33, wherein a subset of each word in said word output is considered by said word voter.

42. The method as set forth in claim 33, wherein said redundant system is a circuitry system.

43. The method as set forth in claim 42, wherein said circuitry system comprises a logical circuitry module.

44. The method as set forth in claim 33, wherein said redundant system comprises a data or signal processing module.

45. The method as set forth in claim 33, wherein said redundant system is a triple modular redundancy system and said n equals 3.

46. The method as set forth in claim 33, wherein said redundant system is a triple modular redundancy simplex system and said n equals 3 and configures to a simplex system comprising a non-faulty module wherein said n equals 1 in case one of said n modules becomes faulty.

47. The method as set forth in claim 33, wherein said n modules have different implementations with a same functionality.

48. The method as set forth in claim 33, wherein said n modules have same implementations with a same functionality.

49. A word voter with n outputs for a triple modular redundancy system, comprising:

(a) three pair-wise matching circuits each having n XNOR gates and n 2-input AND gates to receive output vectors of modules of said triple modular redundancy system; and (b) 2n 2-input AND gates and n 2-input OR gates to generate said n outputs.

50. The word voter as set forth in claim 49, further comprising a one 3-input NOR gate to generate an error signal independent of said n outputs.

51. A word voter with n outputs for a triple modular redundancy simplex system comprising:

(a) three pair-wise matching circuits each having n XNOR gates and n 2-input AND gates to receive output vectors of modules of said triple modular redundancy simplex system;

(b) 2n 2-input AND gates and n 2-input OR gates to generate said n outputs;

(c) five 2-input AND gates and one 2-input OR gate independent of said n; and (d) three flip-flops independent of said n.

52. The word voter of claim 54, further comprising a one 3-input NOR gate to generate an error signal independent of said n.

53. A word-voter with n outputs for a N modular redundancy system comprising:

(a) $\begin{pmatrix} N \\ \lceil N/2 \rceil \end{pmatrix}$ matching circuits; and (b) said matching circuits having n sub-circuits each comprising two ⌈N/2⌉-input AND gates and one 2-input OR gate.

54. The word voter of claim 53, further comprising one $\begin{pmatrix} N \\ \lceil N/2 \rceil \end{pmatrix}-$ input NOR gate to generate an error signal independent of said n.

55. A word-voter with n outputs for a N modular redundancy system comprising:

(a) $\begin{pmatrix} N \\ \lceil N/2 \rceil \end{pmatrix}$ matching circuits;

(b) said matching circuit having a minimum number of pair-wise matching circuits, wherein said minimum number is derived for each said N using a covering procedure;

(c) said pair-wise matching circuits each having n XNOR gates and n 2-input AND gates to receive output vectors of modules of said N modular redundancy system; and (d) AND gates to combine said output vectors of said pair-wise matching circuits.

56. The word voter of claim 55, further comprising one $\begin{pmatrix} N \\ \lceil N/2 \rceil \end{pmatrix}-$ input NOR gate to generate an error signal independent of said n.

* * * * *